(12) United States Patent
Jensen et al.

(10) Patent No.: US 6,732,206 B1
(45) Date of Patent: May 4, 2004

(54) EXPANDED ADDRESSING FOR TRAFFIC QUEUES AND PRIORITIZATION

(75) Inventors: John Neil Jensen, L A, CA (US); Harun Muliadi, Thousand Oaks, CA (US)

(73) Assignee: Accelerated Networks, Moorpark, CA (US)

(*) Notice: Subject to any disclaimer, the term of this patent is extended or adjusted under 35 U.S.C. 154(b) by 0 days.

(21) Appl. No.: 09/368,800

(22) Filed: Aug. 5, 1999

(51) Int. Cl.[7] .......................... G06F 13/42; H04L 12/50
(52) U.S. Cl. ........................ 710/105; 710/106; 370/366
(58) Field of Search ........................... 710/105, 106, 710/111; 370/366, 466, 395

(56) References Cited

U.S. PATENT DOCUMENTS

| | | | | |
|---|---|---|---|---|
| 5,848,068 A | * | 12/1998 | Daniel et al. | 270/395 |
| 5,878,045 A | * | 3/1999 | Timbs | 370/466 |
| 5,923,660 A | * | 7/1999 | Shemla et al. | 370/402 |
| 6,269,096 B1 | * | 7/2001 | Hann et al. | 370/366 |
| 6,418,492 B1 | * | 7/2002 | Papa et al. | 710/302 |
| 6,487,203 B1 | * | 11/2002 | Chung et al. | 370/395.1 |

* cited by examiner

*Primary Examiner*—Tim Vo
(74) *Attorney, Agent, or Firm*—Blakely, Sokoloff, Taylor & Zafman LLP

(57) ABSTRACT

A system of expanding addressing in an addressing constrained environment. A bus that defines a limited number of addresses couples together a master and a plurality of slaves. When each slave has multiple possible target ports, a maximum granularity provided by the addressing may be exceeded. By using a portion of a transmission header as an internal address, the maximum addressing may be expanded to greater granularity. The internal address is then translated in the slave to recover the external address in the header.

16 Claims, 8 Drawing Sheets

| TIME SLOT SCHEDULE | | | | | | | |
|---|---|---|---|---|---|---|---|
| 0 | 1 | 3 | 1 | 0 | 0 | 1 | 3 |

| BIT MASK | Q SCHEDULED |
|---|---|
| 0000 | - |
| 0001 | 0 |
| 0010 | 2 |
| 0011 | 0 |
| 0100 | 2 |
| 0101 | 0 |
| 0110 | 1 |
| 0111 | 0 |
| 1000 | 3 |
| 1001 | 0 |
| 1010 | 1 |
| 1011 | 0 |
| 1100 | 2 |
| 1111 | 0 |

Fig. 6

EXPANDED ADDRESSING FOR TRAFFIC QUEUES AND PRIORITIZATION

BACKGROUND

(1) Field of the Invention

The invention relates to bus system. More specifically, the invention relates to traffic queuing and prioritization in high throughput bus systems.

(2) Background

A number of buses exist which provide for addressing of bus entities. Many of these buses have a relatively small number and therefore, low granularity for the number of entities that can be addressed on the bus. One existing bussing protocol that falls within this genre is the Utopia 2 protocol, as set forth in the Utopia Level 2, V 1.0 June 1995 (Utopia 2). Utopia 2 and subsequent revisions are referred to generically herein as "Utopia" protocols.

Utopia 2 was designed to permit an asynchronous transfer mode (ATM) layer to communicate with a group of Multi-PHYs (MPHYs). Utopia 2 provides for only thirty unique addresses. Thus, the number of bus entities is limited to thirty. This may not be problematic, where each device supplying or consuming data from the Utopia bus provides only a single outbound port from the bus to the outside world. However, when each physical device coupled to the bus has multiple ports, addressing using the bus supported addressing system becomes difficult or impossible.

BRIEF SUMMARY OF THE INVENTION

A system of expanding addressing in an addressing constrained environment is disclosed. A bus that defines a limited number of addresses couples together a master and a plurality of slaves. When each slave has multiple possible target ports, a maximum granularity provided by the addressing may be exceeded. By using a portion of a transmission header as an internal address, the: maximum addressing may be expanded to greater granularity. The internal address is then translated in the slave to recover the external address in the header.

BRIEF DESCRIPTION OF THE DRAWINGS

FIG. 6 shows an example of queue scheduling.

DETAILED DESCRIPTION

Figure 1:
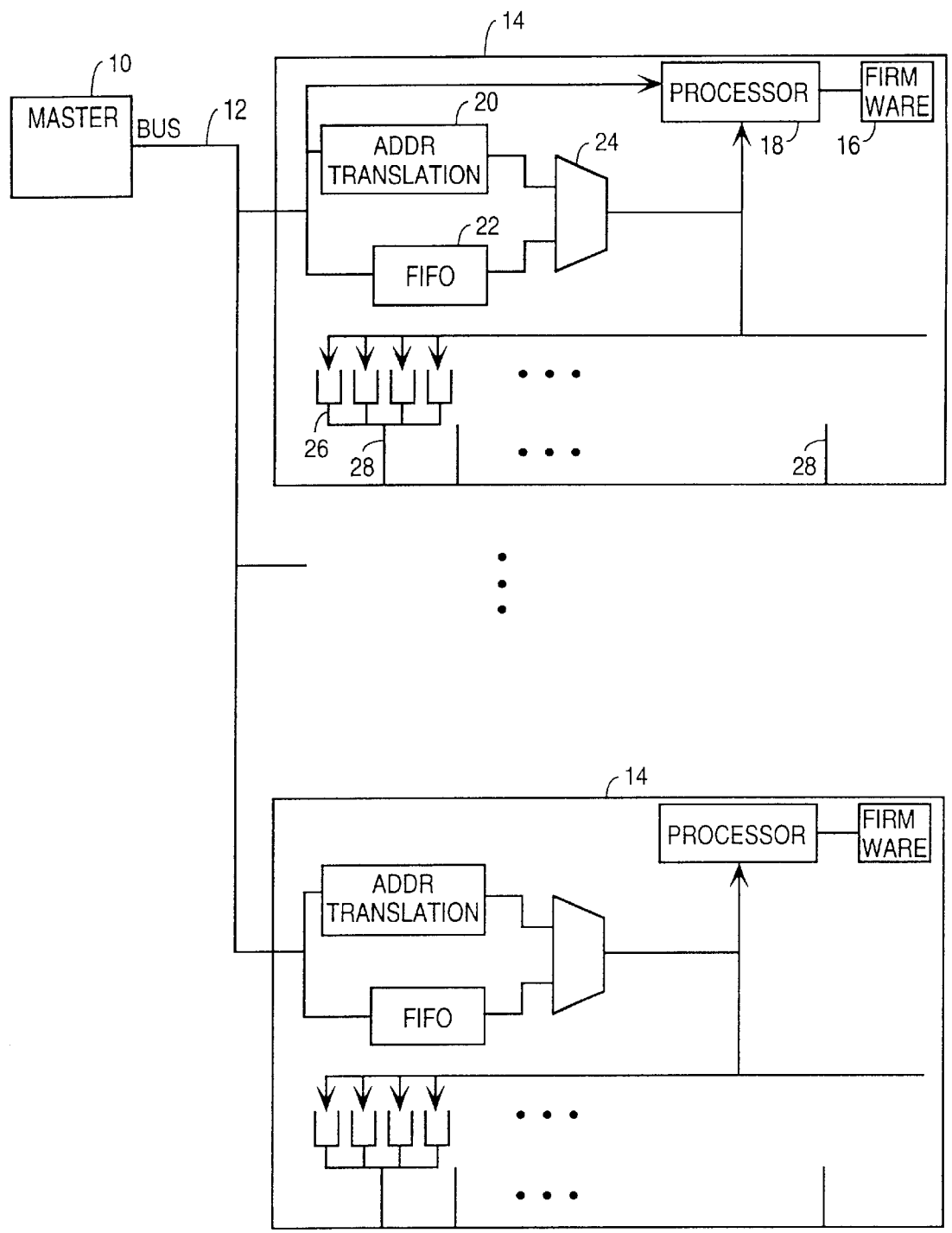
FIG. 1 is a block diagram of a system of one embodiment of the invention.

FIG. 1 is a block diagram of a system of one embodiment of the invention. A master 10 is coupled to a bus 12. A plurality of slaves 14 are also coupled to the bus 12. Slave 14 has a plurality of ports 28 through which it may convey data to the outside world. An embodiment in which the master 10 is an ATM layer and the bus 12 is a Utopia 2 bus addressing for a maximum of thirty MPHYs is provided.

Thus, in a system having, for example, nineteen slaves each with twelve ports, the available MPHY addressing on the Utopia 2 bus is wholly inadequate. This deficiency in addressing is further exacerbated where as in slave 14, each port is provided with a plurality of priority queues 26 into which any particular outgoing message may be queued based on its relative priority.

To accommodate this need for additional addressing, in one embodiment, the master uses bits of the header of an outgoing cell to identify the port and priority of that cell. However, the header should be translated back prior to transmission out the port. To accomplish this, an address translation unit 20 is provided in the slave. An incoming cell is routed to the address translation unit in the FIFO 22. The address translation unit performs an address translation on the header to convert from the internal address to the outgoing header information. For example, a typical ATM cell includes a header comprising 8 bits of a virtual path identifier (VPI) and 16 bits of a virtual circuit identifier (VCI). By using the VPI and VCI to specify an internal address including port and priority within a particular slave (that is identified by the MPHY address) and then converting to the correct external VPI and VCI within the slave, the addressing shortage can be alleviated.

The internal address is provided to processor 18. Firmware 16 causes a processor 18 to remove the cell from the FIFO 22 and route it to the appropriate port and priority queue. Rapid removal of cells from the FIFO is desirable because it prevents head of line blocking. For example, if the FIFO 22, which typically is capable of holding two cells, receives multiple cells for the same port consecutively, a head of line blocking condition may exist. However, because, these cells are removed and placed in a priority queue, the FIFO 22 does not block other incoming cells directed to other ports.

Figure 2:
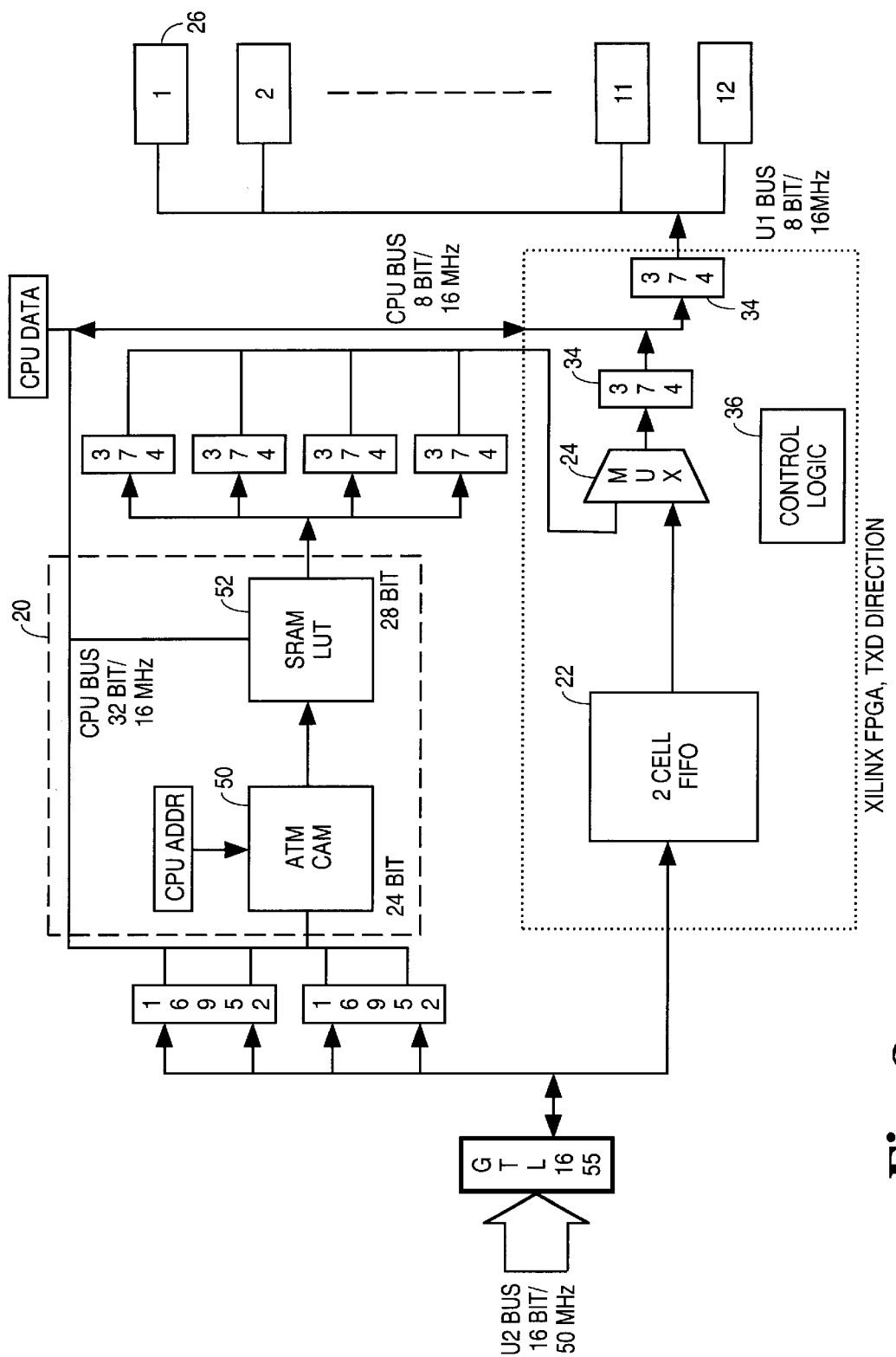
FIG. 2 is a block diagram of transmit operation in one embodiment of the invention.

FIG. 2 is a block diagram of transmit operation in one embodiment of the invention. In this embodiment, the address translation unit 20 includes an ATM content addressable memory (CAM) 50 and a SRAM lookup table (LUT) 52. FIFO 22 is implemented as a Xilinx field programmable gate array (FPGA). An FPGA includes control logic 36 and implements the multiplexer 24 which selects between the translation of the address and data from the FIFO 22. One or more synchronization stages 34 may also be implemented in the FPGA.

Figure 3:
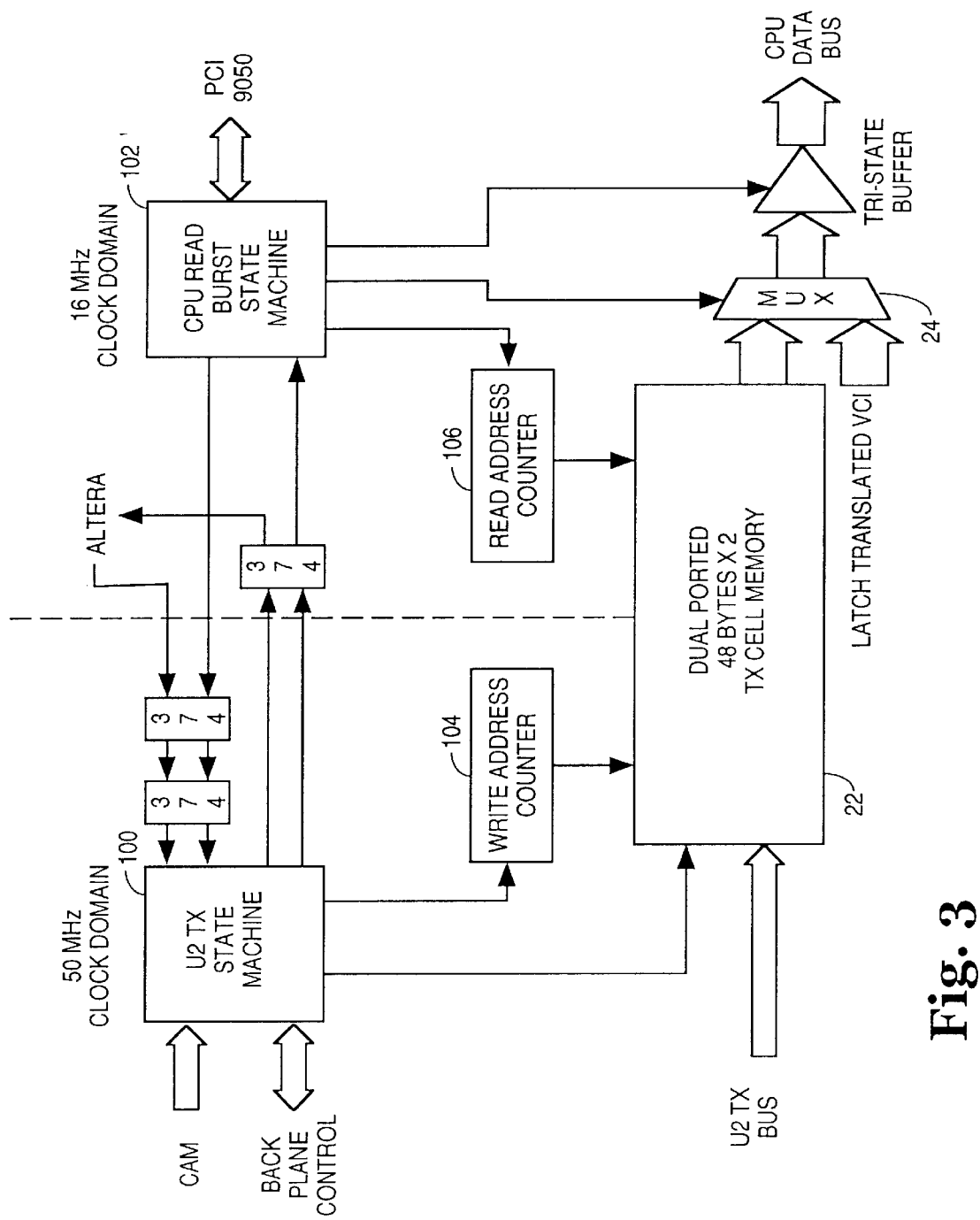
FIGS. 3 and 4 are a block diagram of data flow in the transmit direction within the Xilinx FPGA.
Figure 4:
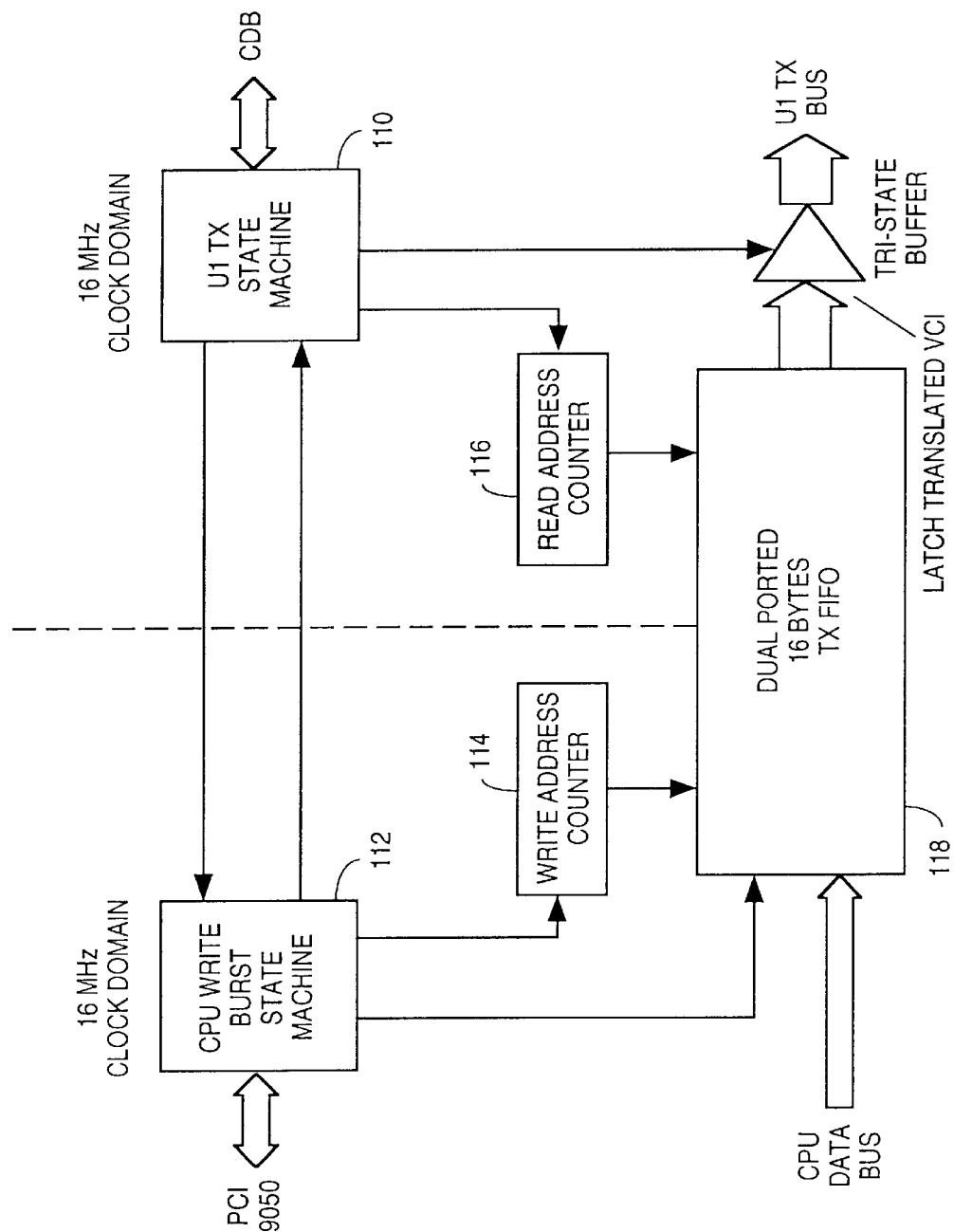

FIGS. 3 and 4 are a block diagram of data flow in the transmit direction within the Xilinx FPGA. The Xilinx includes a Utopia 2 transmit state machine 100, existing in a 50 MHz clock domain with a write counter 104 and a write port of the dual ported FIFO 22. The Utopia 2 transmit state machine 100 is driven by the CAM 50 and the backplane control signals. It, in turn, controls the write address counter. 104 and a write port for the FIFO 22, which receives cells from the Utopia 2 transmit bus. The Utopia 2 transmit state machine 100 is coupled through synchronization stages to a 16 MHz clock domain, and more specifically, to the CPU read burst state machine 102. The CPU read burst state machine 102 controls the multiplexer 24 and the read address counter 106. The CPU read burst state machine is driven by the processor (not shown) across a PCI bus. Similarly, the write burst state machine 112 is controlled by the processor across the PCI bus and, in turn, drives the write address counter 114 for the dual ported transmit data bus FIFO 118. A U1 transmit state machine 110 controls the flow of data onto the bus to the various ports (not shown).

After power up there is space in the two cell FIFO 22 so the U2 TX state machine 100 responds with a TX Cell Available to the U2 backplane controller on the master 10 as soon as the MPHY register is initialized. If the master 10 has a cell for this slave 14, it asserts T2 _NXT signal along with a valid U2 address that is programmed in the MPHY Register to select the particular slave 14 for transfer on the next cell time slot.

The U2 TX state machine latches the first two words externally for VPI/VCI translation, discards the 3rd word and starts writing the 4th word into the TX FIFO. As soon as the first two words are latched, a request is sent to a programmable logic unit for CAM look-up so that the VPI/VCI translation happens in parallel with the 48 byte payload write into the FIFO. After the Altera signals that the look-up is complete, the Xilinx checks the CAM status for a valid or invalid match. If the match is invalid, a TX Discarded Cell counter is incremented and the cell is discarded.

If the look-up is valid, the SRAM LUT 52 output contains the valid target port address and priority queue for the cell. This information is latched in an external register for later retrieval by the processor 18. The U1_TX state machine 110 concurrently polls the CDBs for status to be presented to the CPU together with the cell valid status at the next CPU poll.

After the cell transfer into the FIFO 22 is complete, then a status bit to the processor 18 is set. A cell available status bit is also set. The Xilinx will also present the status of all twelve CDBs to the processor 18. The CDBs are polled in the background, so as not to interfere with other work.

The CPU Burst Read state machine 102 then transfers the cell in two 32 bytes burst to the processor 18. The first byte contains the target port number and a priority queue number with the cell valid status. The second and third byte contains the status of all twelve CDBs. The next five bytes come from the external latches. The rest of the data then comes from the cell FIFO.

The U2 TX state machine 100 again responds with a TX Cell Available when polled by the U2 backplane controller as soon as the data from the external latches are read by the processor 18. Another cell can be received into the FIFO 22 while the first cell is still being transferred to the processor 18.

After the processor 18 analyzes the status byte of the CDBs and determines that a cell can be transferred to a target CDB, the processor 18 can perform a burst write into the U1 TX state machine 110 region.

In one embodiment, the processor is a 603E, available from Motorola of Schaumburg, Ill. The CPU can not do one 64 byte burst, so a FIFO 18 is needed to absorb the latency between two 32 bytes bursts that the processor performs to transfer a whole cell. The latency between the two bursts has been measured to be between 4 to 8 period of the 16 MHz clock.

After the FIFO is filled half way, the U1 TX state machine 110 latches the first byte to be the address of the selected CDB, ignores the second and third bytes, then assert Transmit Enable to start the transfer into the CDB. The CDB shall be programmed to discard the $5^{th}$ byte and recalculate a new header error correction (HEC) for the translated VPI/VCI. The HEC is effectively a cyclic redundancy check (CRC) run over the header. The U1 TX state machine 110 will finish the whole cell transfer to the CDB at about the same time the CPU finishes its two bursts. During this time the background status polling of the CDB is suspended because the CDB address select should be frozen for the CDB address that is currently involved in the cell transfer.

In one embodiment, there are four priority queues 26 associated with each port. A bit mask is retained indicating whether a queue is full or empty. Basically, in one embodiment of the invention, four queues are associated with each port. For each port, a 4-bit bit mask is retained corresponding to $queues_{0-3}$. If a bit in the bit mask is set, the queue has at least one cell waiting to be transferred out. It should be understood that a bit could be set to 1 or set to 0, and such is within the scope and contemplation of the invention. However, assuming that a 1 indicates a queue is non-empty, a bit mask 1000 would indicate that only $queue_3$ for that port is non-empty.

Figure 5:
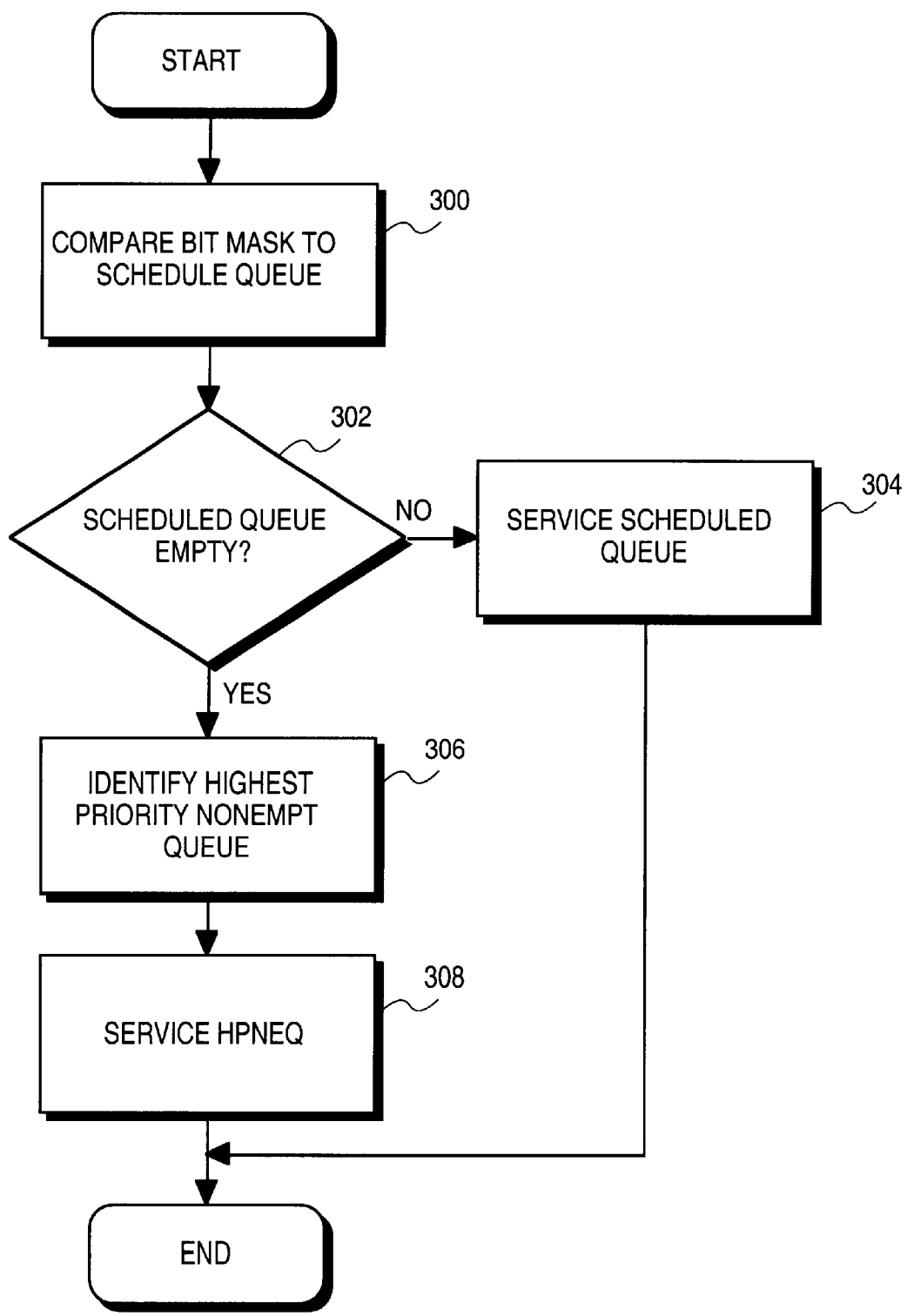
FIG. 5 shows a flow chart of the algorithm.

One embodiment of this system uses a weighted fair round robin algorithm to take cells out of a queue and give them to the port. FIG. 5 shows a flow chart of the algorithm. At functional block 300, a bit mask is compared to a scheduled queue. A determination is made at decision block 302 if the scheduled queue is empty. If the scheduled queue is not empty, the scheduled queue is serviced during that time slot at functional block 304. If the scheduled queue is empty, a highest priority non-empty queue is identified at functional block 306. The identification of the highest priority non-empty queue may be done by indexing into a look-up table with the bit mask. Then at functional block 308, a highest priority non-empty queue is serviced. This algorithm is repeated at each cell time slot and is very efficient, requiring only minimal CPU time.

FIG. 6 shows an example of queue scheduling. A time slot schedule is established for repeating eight time slot schedule. Notably, in this example, $queue_2$ is never scheduled. However, $queue_2$ will be serviced under certain conditions as indicated in the example look-up table. By using the bit mask to index into this table, the queue to be serviced is identified. The identified scheduling presumes that the less significant the bit in the bit mask, the higher priority the queue. Thus, $queue_2$ will be serviced anytime the scheduled queue from the time slot is empty and $queue_1$ and $queue_0$ are empty. Or, stated differently, when the bit mask reads. 0100 or 1100. $Queue_2$ will only starve if at least one of $queue_0$ and $queue_3$ has a cell to transfer out in every time slot except time $slot_2$ and time $slot_7$, and $queue_3$ has a cell to transfer out in every time $slot_2$ and time $slot_7$. The other three queues are always guaranteed a transfer opportunity during the eight time slot schedule. It should be noted that the time slot schedule is arbitrary and could be established in any arbitrary pattern. Moreover, the number of queues and therefore, bit mask size, as well as the time slot schedule are neither limited to eight time slots, nor four queues. Thus, a larger number of queues and more time slots scheduled are envisioned. In one-embodiment, the time schedule is instantiated as a linked list which permits to be dynamically varied and arbitrarily large. Notably, each port may have its own schedule and own priority arrangement, e.g., each port may have a different time slot schedule and different ports may use different priority in the event that the schedule queue is empty. The queues may be held in RAM. In one embodiment, sufficient RAM is provided to hold up to 512 cells per port. If that amount of cells is exceeded, it is preferred to discard additional cells as a result of the oversubscription rather than allow head of line blocking.

In one embodiment, the FPGA puts the burden of queue management and resolving the head of line blocking on the 603 processor. For the processor 18 to be able to handle this task and still do other duties required, 50% CPU utilization is targeted. To meet this target, the CPU should burst a whole cell from and to the FPGA to conserve bus utilization.

The 603 processor has instructions to load and store multiple registers from/to memory. These instructions do not burst the data from/to the FPGA because the 603 implements these instructions as individual bus accesses. To collect these individual bus accesses into burst writes and reads to the FPGA, the FPGA burst region is made cacheable. Cache operations for the 603 are done in 32 bytes increments, therefore a cell transfer are divided into two bursts of 32 bytes each.

Each status read to the FPGA goes through a memory management unit that bridges between the processor local bus and the PCI bus. The PCI bus incurs an additional 1 µs bus utilization time, whereas a 32 byte burst read takes only 2 µs. To conserve worst case timing, the status of the FPGA and CDBs are appended in the first three bytes of the first burst read. If the cell status is valid, firmware burst reads the second half of the cell. If there is no cell to transfer from the FPGA then there is no second burst read to perform, and the CDB status is already available for processing the output queues.

The queue service routine polls the Xilinx based on the internal CPU timer interrupt which is set to 200 uS. This interrupt shares the same enable bit as the external interrupt pin to the 603. To create a higher priority for the internal CPU timer interrupt, hence the queue service routine, the enable bit is reserved for this interrupt. The operating system uses the PLX9050 enable register to control the external interrupt pin, which is connected to the system timer, UART and Ethernet controller on the slave.

Figure 7:
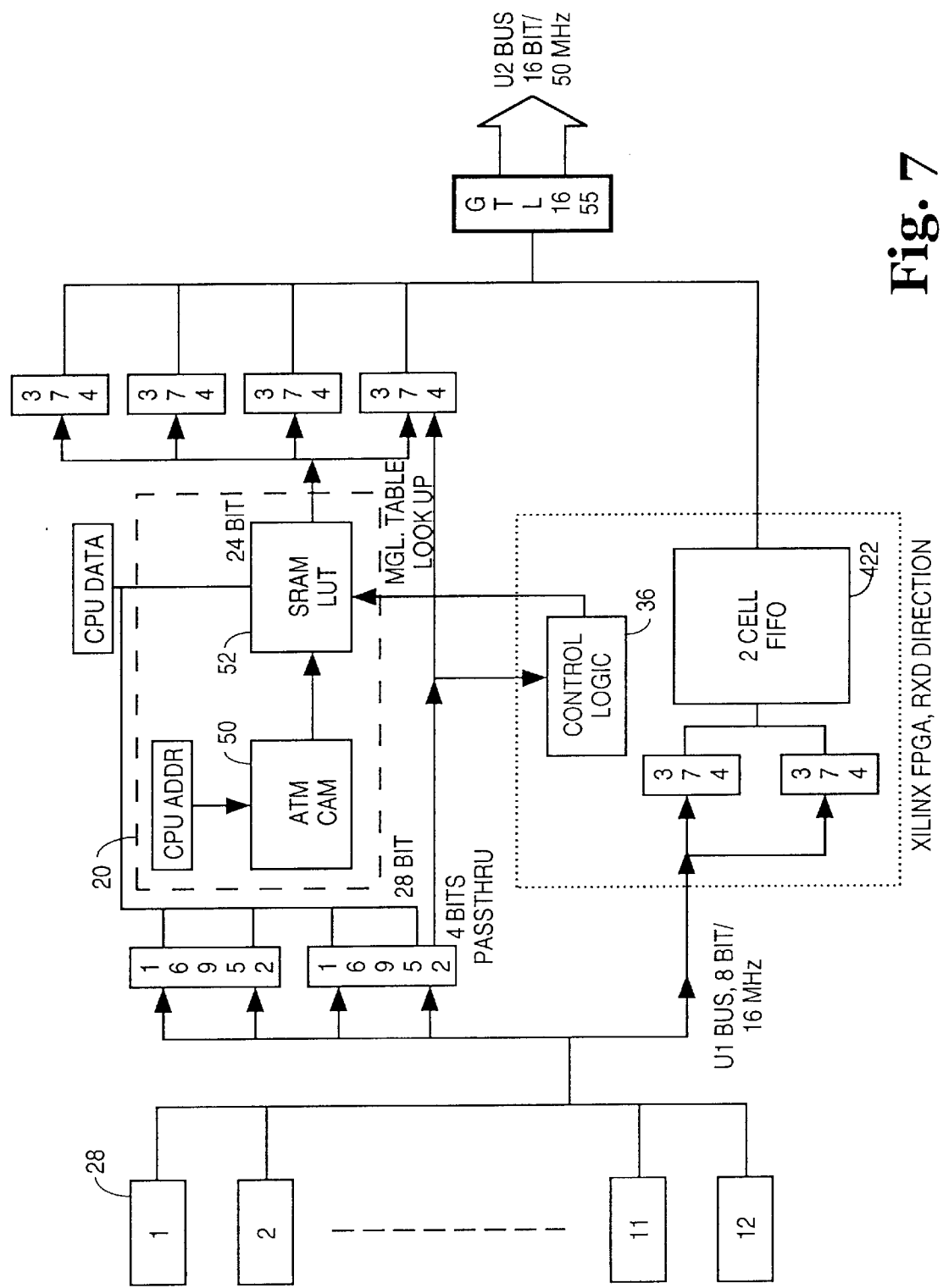
FIG. 7 is a block diagram of the receive operation in one embodiment of the invention.

FIG. 7 is a block diagram of the receive operation in one embodiment of the invention. This diagram references the opposite direction of data flow of that shown in FIG. 2. A cell coming from one of the ports 28 as its header translated to the internal address through translation unit 20, which includes ATM CAM 50 and SRAM LUT 52. The Xilinx has a two cell receive FIFO 422, as well as control logic 36. An incoming cell is passed out the Utopia 2 bus to the master at the earliest opportunity.

Figure 8:
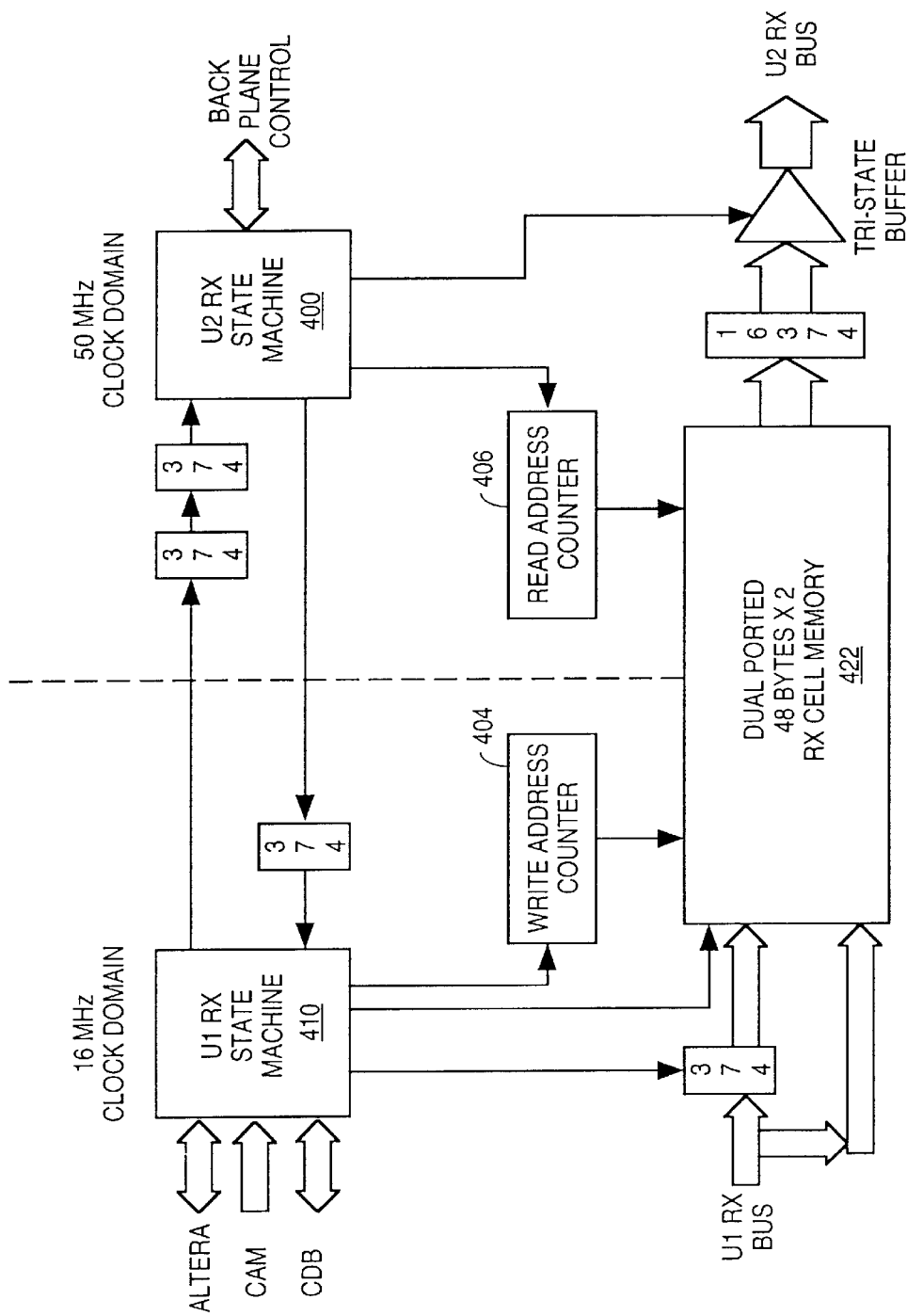
FIG. 8 is a diagram of data flow in a receive direction within the Xilinx of one embodiment of the invention.

FIG. 8 is a diagram of data flow within the Xilinx of one embodiment of the invention. U1 RX state machine 410 controls a write address counter 404 for the dual ported RX cell memory 422. The U1 RX state machine 410 is coupled to synchronization stages to the U2 RX state machine which is responsive to and supplies backplane control signals. The U2 RX state machine 400 also drives the read address counter 406 and controls the tri-state buffer which allows the data to flow onto the U2 RX bus.

The U1 RX state machine 410 polls the twelve CDB's in round robin fashion for an available cell to be forwarded to the backplane. When a CDB is selected, then the polled address remains active for the duration of the cell transfer into the Xilinx internal FIFO 422. The U1 RX state machine generates a Receive Enable signal to the CDB 28 to start the cell transfer. At the same time the first 4 bytes of the cell which comprise the VPI/VCI are also latched into an external register set. After the VPI/VCI are latched then the Xilinx requests the programmable logic unit to do a look-up through the CAM 50. The Payload type is also be latched separately internal to the Xilinx to determine whether the Management Route Table address should be activated. The 5th byte is discarded, then the 48 byte payload is written into the Xilinx internal FIFO 422. Internally, the U1 RX state machine 410 latches the 6th byte then on the next clock cycle writes the 7th byte together with the 6th byte into the 16 bit wide FIFO. The 16 bit wide FIFO is bigendian ordered to follow the Utopia 2 convention, byte 6 appears on U2_RXD[15:8].

As soon as the first 4 bytes of the cell are latched, the U1 RX state machine 410 activates the look-up Request signal to the Altera CPLD so that the look-up can happen in parallel with the 48 byte payload write into the FIFO 422. After the Altera signals that the look-up is complete, the Xilinx checks the CAM status for a valid or invalid match. If the match is invalid, the RX Discarded Cell counter is incremented and the cell is discarded. If the look-up is valid and the cell transfer is complete, then the U1 RX state machine 410 notifies the U2 RX state machine 400 of a valid cell ready for transfer. The U2 RX state machine 400 then responds with an RX Cell Available when polled by the master 10. The master activates the RU2_NXT signal with a matching Utopia 2 address to select the U2_RX state machine 400 for cell transfer on the next time slot. The master then activates the U2 Receive Enable signal to start the cell transfer on the backplane.

The U2_RX state machine 400 outputs enable the 1st word of the translated VPI onto the backplane from latched external register, together with the U2 Start Of Cell signal. Then the 2nd translated VCI word is output onto the backplane. The 2nd word is output again on the 3rd clock of backplane cell transmission to represent the UDF1 and UDF2 bytes. The switch fabric on the master discards the 3rd word since the HEC has not been recalculated on the translated header.

The U2 RX state machine 400 then proceeds with the rest of the 48 byte payload transfer on the backplane and also notify the U1 RX state machine 410 that the external registers are available for another address translation.

Meanwhile, the U1_RX state machine 410 continues polling with the next addresses and stopping when there is a CDB with a cell available. It then waits until the previous translated VPI/VCI are transferred to the backplane before it starts another transfer from the CDB. The cycle repeats, but the previous cell is still in the FIFO being transferred to the switch fabric on the master.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:
a bus having a defined maximum supported number of addresses;
a master coupled to the bus; and
a plurality of slaves having a maximum granularity greater than the maximum number of supported addresses, wherein the master addresses a transmission with an internal address having a granularity at least as great as the maximum granularity of the plurality of the slaves and wherein a target slave translates the internal address to an external address.

2. The system of claim 1 wherein the master is an asynchronous transfer mode (ATM) layer and the transmission is an ATM cell.

3. The system of claim 1 wherein the master operates under a Utopia protocol.

4. The system of claim 2 wherein a first portion of a header of the cell is used as the internal address.

5. The system of claim 2 wherein a second portion of a header of the cell is used to identify a priority of the cell.

6. The system of claim 2 wherein at least one slave of the plurality comprises:

a first in first out buffer (FIFO) to hold an incoming cell;

a content addressable memory (CAM) logic to perform translation of a cell header;

a plurality of ports; and firmware that removes the incoming cell from the FIFO and queues it to a port identified in the cell header.

7. The system of claim 6 wherein each port of the plurality has a plurality of priority queues associated therewith.

8. A method comprising:

translating a header of an asynchronous transfer mode (ATM) cell containing an internal address to contain an external address; and queuing the cell to a port specified by the internal address.

9. The method of claim 8 wherein the port has a plurality of priority queues associated therewith further comprising:

servicing the priority queues in a weighted fair round robin algorithm.

10. The method of claim 9 wherein servicing comprises:

determining if a scheduled queue is non-empty;

transmitting a cell from the scheduled queue out the port if the scheduled queue is non-empty;

identifying a next highest priority non-empty queue if the scheduled queue is empty; and transmitting a cell from the next highest priority non-empty queue.

11. The method of claim 10 wherein determining comprises:

setting a bit in a queue mask when a queue corresponding to the bit becomes non-empty; and ANDing the queue mask with a scheduled queue indicator.

12. The method of claim 10 wherein identifying comprises:

indexing into a lookup table using a queue mask.

13. An apparatus comprising:

a content addressable memory (CAM) for translating between an internal address and an external address;

a first in first out buffer (FIFO) to hold a transaction payload;

a port;

a queue associated with the port; and a processor to remove the payload from the FIFO and store it in the queue.

14. The apparatus of claim 13 further comprising:

a plurality of priority queues associated with the port.

15. The apparatus of claim 14 wherein the processor services the priority queues in a weighted fair round robin schedule.

16. The apparatus of claim 14 further comprising:

a time slot schedule retained as a linked list; and a bit mask corresponding to a state of the queues.

* * * * *